(12) United States Patent
Kulesia, II et al.

(10) Patent No.: US 10,767,807 B2
(45) Date of Patent: Sep. 8, 2020

(54) APPLIANCE STAND

(71) Applicants: Thomas Kulesia, II, Elkhart, IN (US); Greggory Tuholski, Bristol, IN (US)

(72) Inventors: Thomas Kulesia, II, Elkhart, IN (US); Greggory Tuholski, Bristol, IN (US)

( * ) Notice: Subject to any disclaimer, the term of this patent is extended or adjusted under 35 U.S.C. 154(b) by 0 days.

(21) Appl. No.: 15/898,139

(22) Filed: Feb. 15, 2018

(65) Prior Publication Data
US 2018/0231174 A1    Aug. 16, 2018

Related U.S. Application Data

(60) Provisional application No. 62/459,323, filed on Feb. 15, 2017.

(51) Int. Cl.
| | | |
|---|---|---|
| *F16M 11/04* | (2006.01) | |
| *F16M 11/10* | (2006.01) | |
| *F16M 11/42* | (2006.01) | |
| *F16M 11/20* | (2006.01) | |
| *F16M 11/24* | (2006.01) | |

(52) U.S. Cl.
CPC ......... *F16M 11/046* (2013.01); *F16M 11/045* (2013.01); *F16M 11/105* (2013.01); *F16M 11/2021* (2013.01); *F16M 11/2085* (2013.01); *F16M 11/24* (2013.01); *F16M 11/42* (2013.01); *F16M 2200/022* (2013.01); *F16M 2200/024* (2013.01); *F16M 2200/027* (2013.01); *F16M 2200/028* (2013.01); *F16M 2200/066* (2013.01)

(58) Field of Classification Search
CPC .. F16M 11/046; F16M 11/045; F16M 11/105; F16M 11/2021; F16M 11/11; F16M 11/2085; F16M 11/24; F16M 11/42; F16M 2200/022; F16M 2200/024; F16M 2200/066; Y10T 403/32459; Y10T 403/32451; Y10T 403/32073
USPC ......... 248/124.1, 124.2, 286.1, 287.1, 284.1, 248/282.1, 278.1, 183.1, 183.2
See application file for complete search history.

(56) References Cited

U.S. PATENT DOCUMENTS

| 411,493 A * | 9/1889 | Ducker ................ A47B 23/042 |
| | | 248/451 |
| 908,751 A * | 1/1909 | Cooke .................... A47B 57/42 |
| | | 248/224.8 |

(Continued)

OTHER PUBLICATIONS

Manfrotto 132; https://www.manfrotto.us/black-light-boom-w-stand; website printed [Feb. 28, 2018].

(Continued)

*Primary Examiner* — Kimberly T Wood
(74) *Attorney, Agent, or Firm* — Notre Dame Intellectual Property Clinic

(57) ABSTRACT

A portable, multi-configuration appliance stand capable of supporting one or more appliances, including but not limited to dryers, lights, and blowers. In embodiments, the appliance stand includes an appliance arm that supports the appliance, where the appliance arm is attached to an arm support via a multi-axial connector that functions as a multi-axial connector joint. In embodiments, the multi-axial connector is capable of translating along at least two axes, as well as rotating. In other embodiments, a locking mechanism secures the multi-axial connector at a fixed configuration between the appliance arm and the arm support.

19 Claims, 11 Drawing Sheets

(56) References Cited

U.S. PATENT DOCUMENTS

| | | | | |
|---|---|---|---|---|
| 1,037,140 | A * | 8/1912 | French | A47B 19/06 |
| | | | | 248/447.2 |
| 2,235,367 | A * | 3/1941 | Heausler | A47B 23/007 |
| | | | | 248/444.1 |
| 2,442,736 | A * | 6/1948 | Valentine | F16M 11/14 |
| | | | | 248/124.2 |
| 2,453,863 | A * | 11/1948 | Salisbury | G01B 5/00 |
| | | | | 269/101 |
| 3,223,826 | A | 12/1965 | Macaluso, Jr. | |
| 3,709,585 | A * | 1/1973 | Tsai | A45D 42/18 |
| | | | | 248/480 |
| 3,787,015 | A * | 1/1974 | Ablett | H01Q 1/1228 |
| | | | | 248/230.2 |
| 3,804,355 | A | 4/1974 | Uroshevich | |
| 4,140,296 | A * | 2/1979 | Guzman Guillen | |
| | | | | A47B 23/007 |
| | | | | 248/286.1 |
| 4,228,489 | A | 10/1980 | Martin | |
| 4,523,256 | A | 6/1985 | Small | |
| 4,735,389 | A * | 4/1988 | Graham | F16M 11/24 |
| | | | | 248/124.2 |
| 5,342,447 | A * | 8/1994 | Nudo | B05B 12/28 |
| | | | | 118/504 |
| 5,424,931 | A | 6/1995 | Wheeler | |
| 5,671,900 | A | 9/1997 | Cutler | |
| 5,725,192 | A * | 3/1998 | Cloninger | A47B 97/04 |
| | | | | 248/447 |
| 6,089,167 | A * | 7/2000 | Frohardt | H05K 9/0067 |
| | | | | 108/142 |
| 6,129,319 | A | 10/2000 | Metelski | |
| 6,764,055 | B1 * | 7/2004 | Lee | A47B 23/00 |
| | | | | 248/125.1 |
| 6,848,144 | B1 * | 2/2005 | McDonald | A47L 9/0036 |
| | | | | 15/246.2 |
| 6,889,952 | B2 * | 5/2005 | Cook | A47B 97/08 |
| | | | | 248/448 |
| 7,569,024 | B1 * | 8/2009 | Reznik | A61F 5/3761 |
| | | | | 602/36 |
| 8,424,825 | B2 * | 4/2013 | Somuah | B60R 11/0235 |
| | | | | 248/130 |
| 9,220,343 | B2 * | 12/2015 | Selwa | A47B 97/04 |
| 10,099,524 | B1 * | 10/2018 | Landry | B60D 1/06 |
| 2005/0205728 | A1 * | 9/2005 | Avery | A45F 5/00 |
| | | | | 248/149 |
| 2006/0050173 | A1 * | 3/2006 | Ajioka | B25J 17/0283 |
| | | | | 348/373 |
| 2006/0245186 | A1 | 11/2006 | Stilman | |
| 2007/0040089 | A1 * | 2/2007 | Shiff | A47B 97/04 |
| | | | | 248/448 |
| 2012/0056050 | A1 * | 3/2012 | Huang | F16M 11/045 |
| | | | | 248/124.1 |

OTHER PUBLICATIONS

Manfrotto 085; https://www.manfrotto.us/black-column-light-stand-w-locking-wheels-removable-base; website printed [Feb. 28, 2018].

* cited by examiner

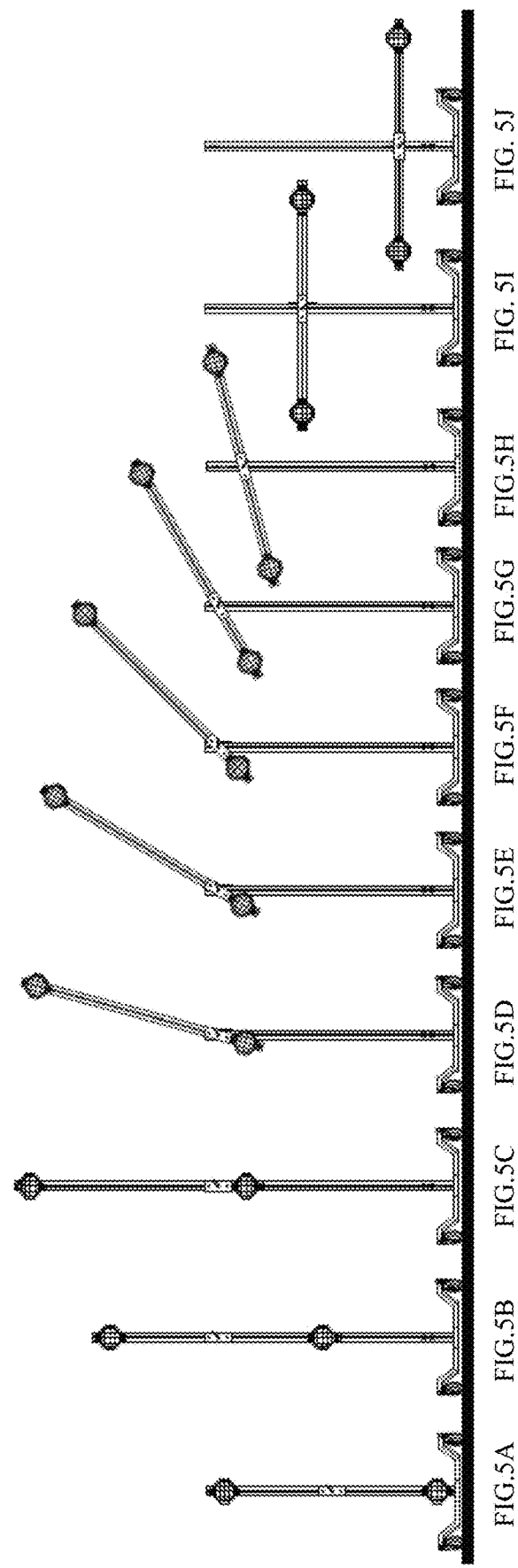

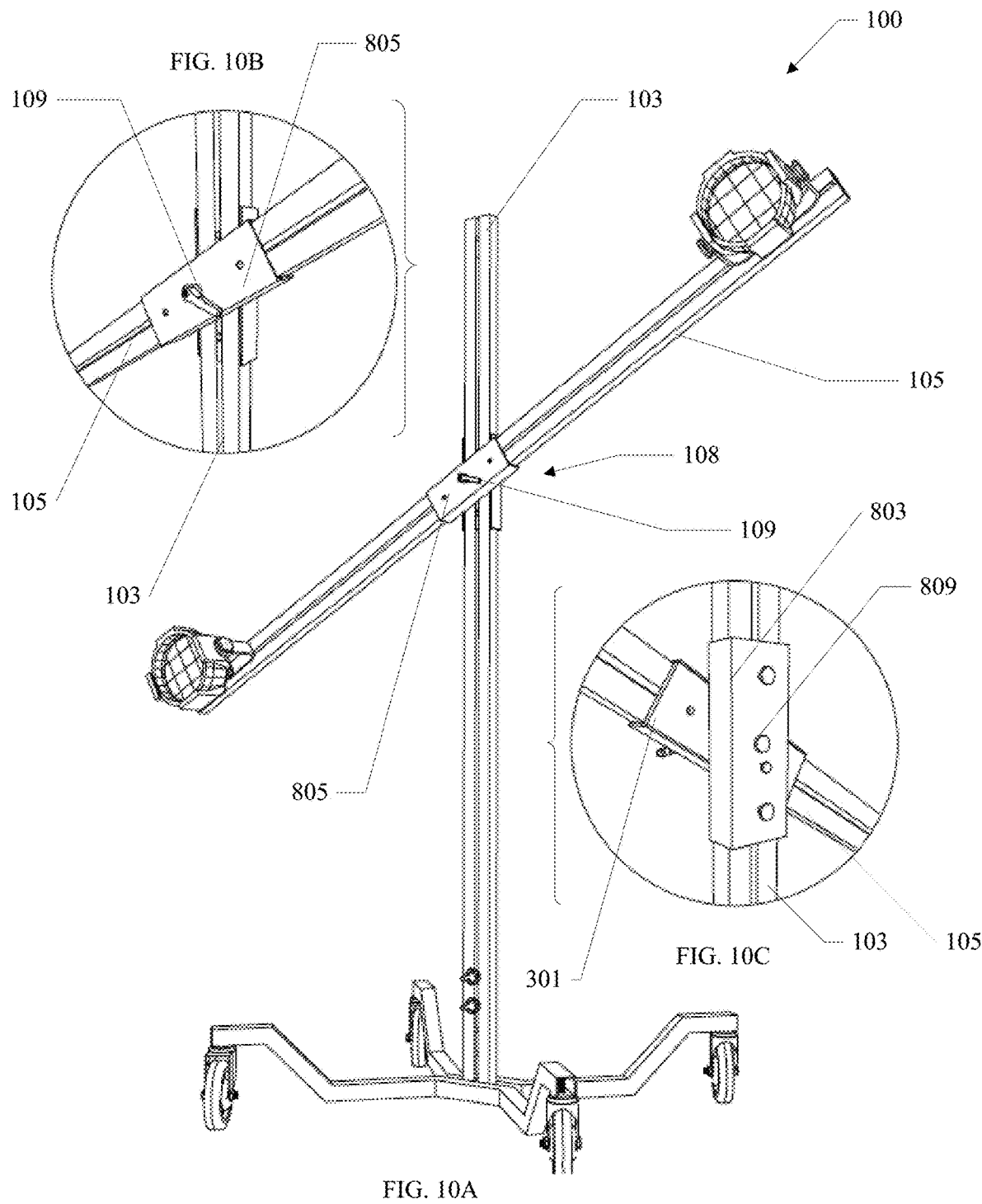

APPLIANCE STAND

CROSS REFERENCE TO RELATED APPLICATIONS

This application claims the benefit of U.S. provisional application No. 62/459,323 Service Lamp Stand, filed Feb. 15, 2017, which is incorporated herein by reference.

BACKGROUND

Many manufacturing shops, warehouses and other environments use stands or fixtures to hold appliances, allowing workers to have their hands free for tools. Properly positioning or repositioning stands to ensure that appliances are at the desired locations can be annoying and time consuming. For example, effective lighting is a necessity in the manufacturing arena, which requires precision and visibility to reduce errors. Because mistakes can be costly, time consuming, and wasteful, it is important to the industry to be able to control work environment conditions to the greatest extent possible. Although this type of control is essential to many industries, current light systems do not effectively address problems faced by industry professionals.

There is also a need for more flexible stands capable of supporting other shop appliances, like dryers, exhaust fans, exhaust hoods, electronic devices, or any other device designed to perform a specific task. These stands allow users to position the appliances and then leave the users hands free for other tools or work. A continuing problem has been the lack of a durable stand capable of adapting to a wide variety of desired configurations. In any industry where the requirements for lighting or other appliances vary on a project-by-project basis, precise and easy manipulation of light sources or the position of other appliances is highly desirable.

BRIEF SUMMARY

The following presents a simplified summary in order to provide a basic understanding of some aspects of the claimed subject matter. This summary is not an extensive overview. It is not intended to either identify key or critical elements or to delineate the scope of the claimed subject matter. Its sole purpose is to present some concepts in a simplified form as a prelude to the more detailed description that is presented later.

Generally, the described apparatuses and methods include supporting stands, or other stands where the described apparatus is capable of embodying various configurations. While the described stand can be used in a variety of settings, it can be particularly useful in manufacturing, where, for example, clear, strong light may be required to ensure quality. Embodiments of the appliance stand enable this control of appliances and tools on a worksite through their flexibility, sturdiness, and ease of manipulation. While a manufacturing facility would certainly benefit from the described appliance stand, the stand is useful for any industry, commercial space, or private shop, as well as for personal use.

In embodiments, the described appliance stand comprises an arm support having an arm support slot that extends longitudinally on the arm support; an appliance arm configured to support at least one appliance, the appliance arm having an appliance arm slot extending longitudinally on the appliance arm; a multi-axial connector that connects the appliance arm to the arm support, the multi-axial connector having a pivot seated within the arm support slot and extending through the appliance arm slot; and a locking mechanism that selectively secures the multi-axial connector and the appliance arm. In other embodiments, the pivot is configured to slide within the appliance arm slot in such a way that the appliance arm translates along a longitudinal axis of the appliance arm. The pivot is also configured to slide within the arm support slot in such a way that the appliance arm translates along the longitudinal axis of the arm support. The appliance arm is configured to rotate around the pivot in a pinwheel motion.

In other embodiments, the locking mechanism is configured to frictionally engage the appliance arm and the arm support to hold the appliance arm in a desired position. In another embodiment, the locking mechanism includes a mounting plate and a back plate connected to the pivot and positioned on opposite sides of the appliance arm and the arm support, wherein the locking mechanism is configured in a such a manner that the mounting plate and the back plate act as a clamp to frictionally engage the appliance arm and the arm support.

In embodiments, the appliance stand comprises an appliance arm capable of supporting one or more appliances; an arm support that supports the appliance arm; and a multi-axial connector that connects the appliance arm and the arm support, the multi-axial connector configured to facilitate translational movement of the appliance arm along a first axis and a second axis, and rotational movement of the appliance arm around a third axis. The arm support can include a first longitudinal channel along the first axis and the multi-axial connector can slide along the longitudinal channel in such a way that the appliance arm translates along the first axis. The appliance arm can include a second longitudinal channel along the second axis and the multi-axial connector can slide along second longitudinal channel in such a way that the appliance arm translates along the second axis. In embodiments, the third axis is substantially perpendicular to the first longitudinal channel of the arm support and the second longitudinal channel of the appliance arm, and the multi-axial connector is configured to rotate in such a way that the appliance arm rotates around the third axis.

In still another embodiment, an appliance stand apparatus comprises an arm support having an arm support slot that extends longitudinally on the arm support; an appliance arm configured to support at least one appliance, the appliance arm having an appliance arm slot extending longitudinally on the appliance arm; a multi-axial connector that connects the appliance arm to the arm support, the multi-axial connector having a pivot seated within the arm support slot and extending through the appliance arm slot; the pivot configured to slide within the arm support slot and within the appliance arm slot to translate the appliance arm relative to the arm support and wherein the appliance arm is configured to rotate around the pivot; and a locking mechanism configured to selectively secure the appliance arm, wherein the locking mechanism includes a mounting plate and a back plate connected to the pivot and positioned on opposite sides of the multi-axial connector, wherein the mounting plate and the back plate are drawn towards to clamp the appliance arm and the arm support.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The systems, devices and methods may be better understood by referring to the following description in conjunction with the accompanying drawings, in which like numerals indicate like structural elements and features in various figures. The components in the figures are not necessarily to scale, and simply illustrate the principles of the systems, devices and methods. The accompanying drawings illustrate only possible embodiments of the systems, devices and methods and are therefore not to be considered limiting in scope.

FIGS. 5A-5J depict alternate views of an embodiment of the appliance stand showing rotation and cantilevering capability of the appliance arm.

FIGS. 10A-10C depict multiple views of an embodiment of the multi-axial connector in a secured position from the front and back.

DETAILED DESCRIPTION

Figure 1:
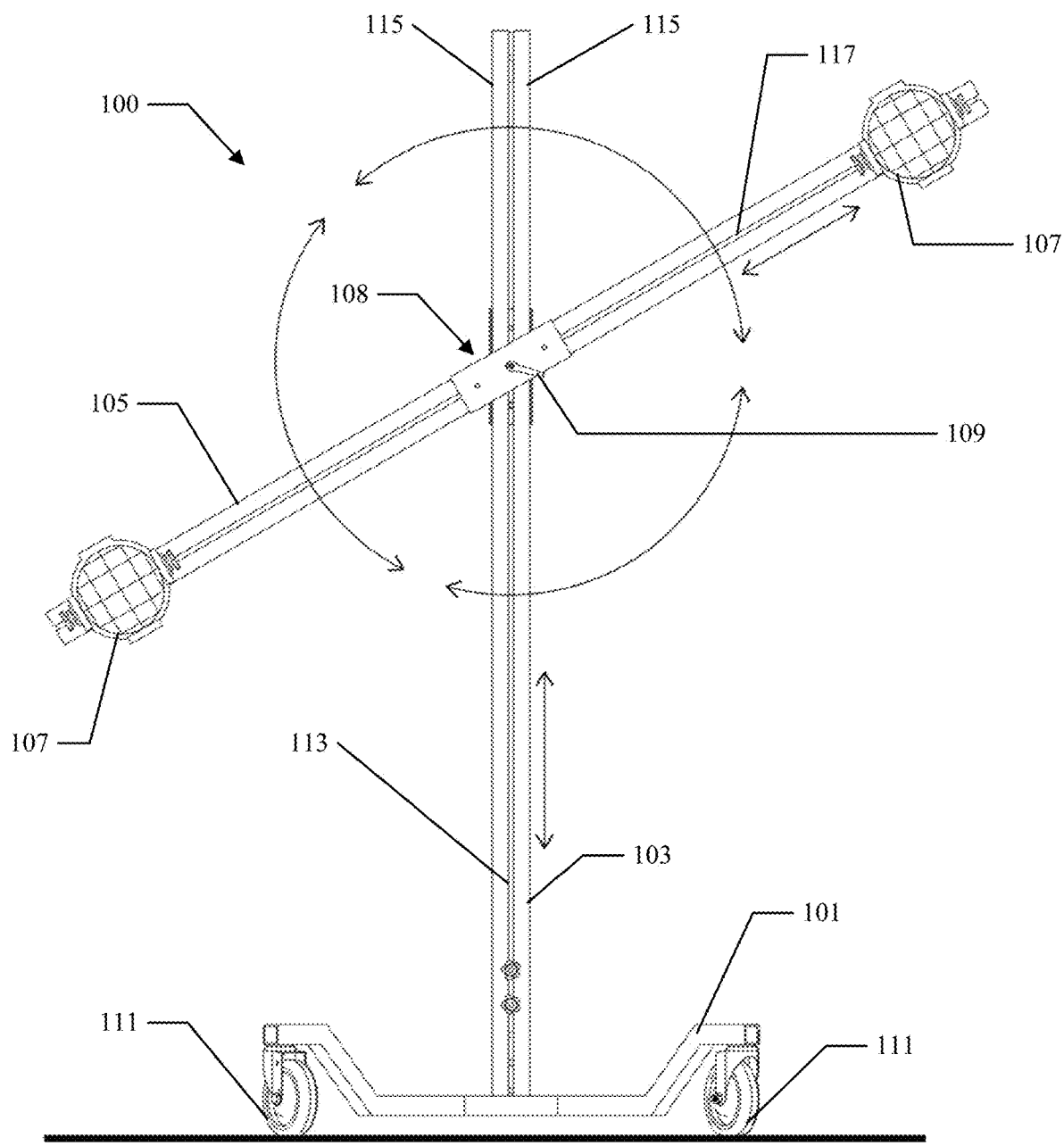
FIG. 1 depicts an embodiment of the appliance stand with the appliance arm positioned at an angle relative to the arm support.

Aspects of the system and methods are described below with reference to illustrative embodiments. The references to illustrative embodiments below are not made to limit the scope of the claimed subject matter. Instead, illustrative embodiments are used to aid in the description of various aspects of the systems and methods. The description, made by way of example and reference to illustrative reference is not meant to being limiting as regards to any aspect of the claimed subject matter.

An appliance stand 100 is disclosed and described herein, where the appliance stand 100 can support one or more appliances 107, including but not limited to lights, dryers, fans, electronic devices, exhaust hoods, blowers and any other device designed for one or more tasks. For example, the appliance stand 100 can support one or more lights to provide a well-lit workspace in a facility. Embodiments of the described appliance stand 100 are capable of adapting to a plurality of configurations and allow a user to control both position and angle of attached appliances. This can be particularly valuable where lights are attached to the appliance stand 100 as it allows for precise control of light exposure on a worksite, which can reduce or minimize the risk of costly errors. The adaptability of the appliance stand 100 also allows use with appliances 107 aside from lights, including, but not limited to, lights, heaters, dryers, fans, electronic devices, exhaust hoods, blowers, and any other device designed to perform one or more tasks. The ability to attach and position multiple appliances frees the hands of workers or users for other tools or work.

In aspects, the appliance stand 100 includes an appliance arm 105, to which multiple appliances 107 can be attached, and an arm support 103 that holds the appliance arm 105. The appliance arm 105 and arm support 103 are connected by a multi-axial connector 108 that controls movement of the appliance arm 105 relative to the arm support 103 and enables multiple possible configurations of the appliance stand 100. In an embodiment, the multi-axial connector 108 allows the appliance arm 105 to be moved along the longitudinal axis of the arm support 103, translated along the longitudinal axis of the appliance arm 105 itself, and finally rotated up to 360 degrees around the multi-axial connector 108 to change the angle of the appliance arm 105 relative to the arm support 103. This movement of the appliance arm 105 along or around 3 different axes gives the stand tremendous flexibility in positioning of appliances 107. The flexibility of the appliance stand 100 makes the device useful for a variety of projects, each having its own unique requirements. Further, the mobility and durability of the appliance stand 100 are particularly useful in an industrial setting.

Figure 2:
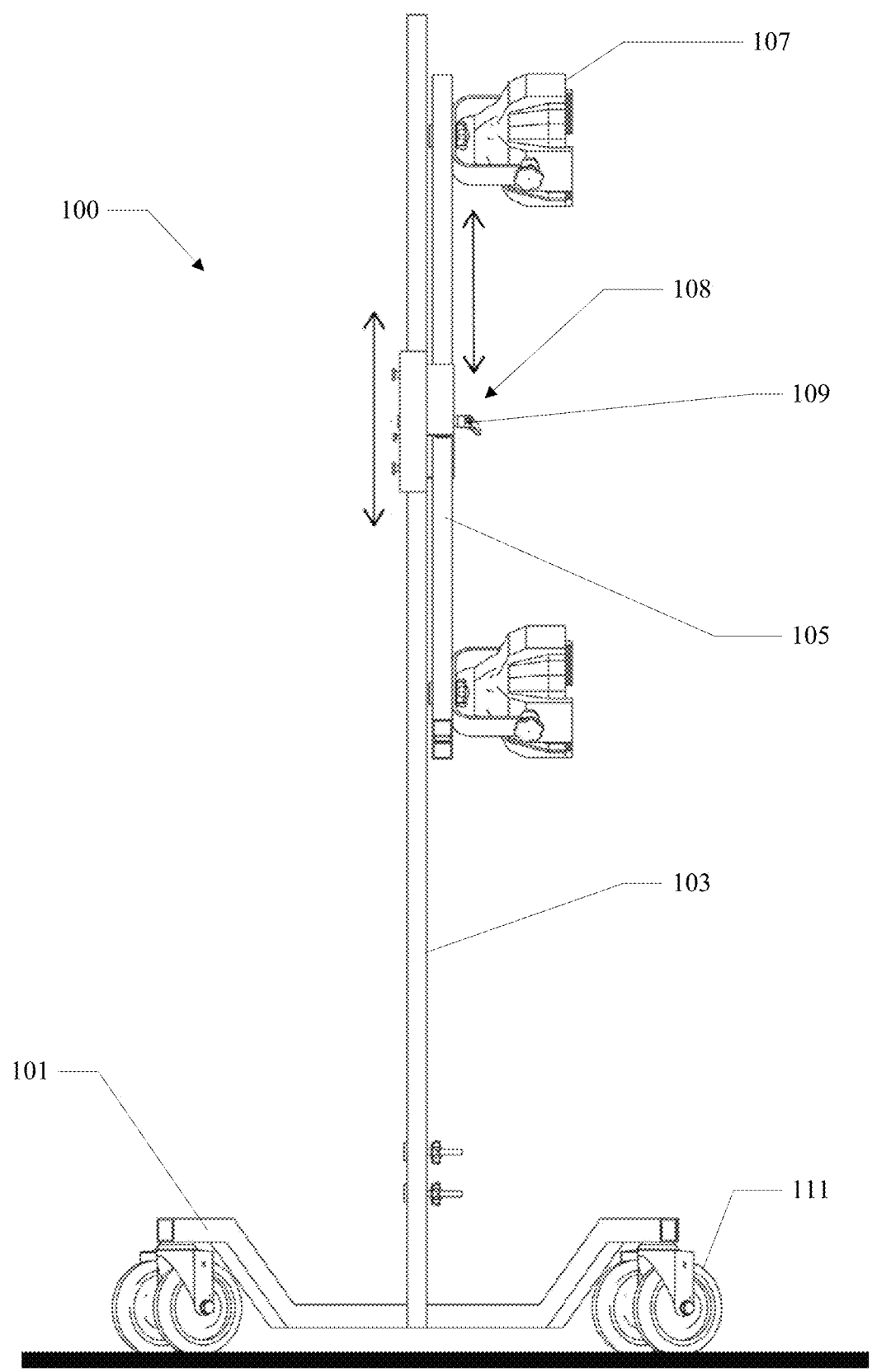
FIG. 2 depicts a side view of an embodiment of the appliance stand.

Turning now to FIG. 1, a front view of an embodiment of the appliance stand 100 is shown. FIG. 2 is a side view of the embodiment of the appliance stand 100 shown in FIG. 1. The illustrated embodiment of the appliance stand 100 includes a base 101 that rests on the ground or floor and can be mounted on casters 111 or wheels to allow the appliance stand 100 to be easily moved and positioned. As shown, the base 101 can be relatively wide to provide a stable foundation for the appliance stand 100. The base 101 can be wider or smaller, depending on the size of the appliance stand 100 and the size of the workspace. In embodiments, the base 101 is connected to an upright arm support 103, which attaches to an appliance arm 105. In aspects, both the arm support 103 and appliance arm 105 are capable of holding one or more appliances 107, such as a light. While generally depicted as a substantially straight arm, the appliance arm 105 can be curved, T-shaped, S-shaped, include branches or take any other form suitable for supporting one or more appliances 107. The arm support 103 and the appliance arm 105 are connected by an attachment mechanism or multi-axial connector 108 that enables the appliance arm 105 to be moved longitudinally along the arm support 103. In embodiments, the multi-axial connector 108 can also enable the appliance arm 105 to move longitudinally along the longitudinal axis of the appliance arm 105 or the length of the appliance arm 105 itself. In additional embodiments, the multi-axial connector 108 enables the appliance arm 105 to be rotated around the multi-axial connector 108. As shown in FIG. 1, the appliance arm 105 can rotate around an axis substantially perpendicular to both the longitudinal axis of the arm support 103 and the longitudinal axis of the appliance arm 105. An embodiment of the multi-axial connector 108 is shown in detail in FIG. 8 below, and can include a handle 109, used to lock the multi-axial connector 108 in place, securing the position of the appliance arm 105. In embodiments, the single multi-axial connector 108 is user-friendly, and provides a single joint or connector that controls motion of the appliance arm 105 along multiple axes and directions. This single joint can be less prone to failure than a stand including multiple joints, each joint controlling a single axis or direction of motion.

An embodiment of the appliance stand 100 includes the single multi-axial connector 108, which enables adjustment of the configuration of the appliance stand 100. The multi-axial connector 108 joins the appliance arm 105 to the arm support 103 and enables manipulation of the appliance arm 105 in three ways: longitudinally along the arm support 103, longitudinally along the appliance arm 105, and angularly. First, the appliance arm 105 can be adjusted relative to the arm support 103, in some instances raising and lowering the appliance arm 105 along the longitudinal axis of the arm support 103. Next, the connection point between the appliance arm 105 and the arm support 103 can be moved longitudinally from the midpoint of the appliance arm 105 (as depicted in FIG. 1) towards either end of the appliance arm 105 along the longitudinal axis of the appliance arm 105. Finally, the appliance arm 105 can be rotated to change the angle between the arm support 103 and the appliance arm 105, so that the appliance arm 105 is parallel to the arm support 103, perpendicular to the arm support 103, or any angle in between. A subset of the possible configurations that can be achieved using the multi-axial connector 108 are shown and described in greater detail below with respect to FIGS. 5A-5J.

Turning again to FIG. 1, angular adjustment of the appliance arm 105 changes the angle of the appliance arm 105 relative to the arm support 103. In the illustrated embodiment, the multi-axial connector 108 enables rotation of the appliance arm 105 around an axis generally perpendicular to the arm support 103 and appliance arm 105. As illustrated by the circular line segments ending in arrows, the appliance arm 105 can rotate in either direction up to 360 degrees, similar to the rotation of a blade of a windmill. The user can select a preferred angle and position the appliance arm 105 at the selected angle via the multi-axial connector 108.

In another embodiment, the multi-axial connector 108 enables translational motion of the appliance arm 105 along the longitudinal axis of the arm support 103 as indicated by the vertical arrows in FIG. 1. When the arm support 103 is substantially vertical, as shown in FIG. 1, the appliance arm 105 can be raised and lowered along the longitudinal axis of the arm support 103. This vertical adjustment occurs when the appliance arm 105 is moved vertically relative to the upright arm support 103.

In embodiments, the multi-axial connector 108 also enables longitudinal movement of the appliance arm 105. Here, the multi-axial connector 108 modifies the point at which the appliance arm 105 is connected to the arm support 103 longitudinally on the appliance arm 105. As shown in FIG. 1, the appliance arm 105 is attached to the arm support 103 at roughly the center of the appliance arm 105. However, the multi-axial connector 108 enables the appliance arm 105 to be translated along the longitudinal axis of the appliance arm 105 in either direction. For example, in the configuration shown in FIG. 3 or FIG. 5G, the appliance arm 105 is translated or slid through the multi-axial connector 108 toward an end of the appliance arm 105, resulting in a cantilevered appliance arm 105. Similarly, the appliance arm 105 can be translated in the opposite direction to be cantilevered to the other side of the appliance stand 100.

In embodiments, the multi-axial connector 108 supports movement along or around three different axes. First, it provides for rotation of the appliance arm 105 around an axis perpendicular to the arm support 103. Next, it provides for translational motion along the longitudinal axis of the arm support 103. Finally, it provides for translational motion along the longitudinal axis of the appliance arm 105 itself. This motion relative to the three different axes enables an incredible variety of configurations. In embodiments, once the appliance arm 105 is positioned in the desired configuration, the multi-axial connector 108 can be secured via a locking mechanism, described in more detail with respect to FIGS. 8 and 9 below. In embodiments, the locking mechanism includes a handle 109 or crank that is rotated to engage the locking mechanism and effectively clamp the multi-axial connector 108 in place. In an embodiment, the handle 109 can be located at the front of the appliance stand 100, as shown in FIG. 1, or in another embodiment, at the back of the appliance stand 100, as seen in FIG. 3.

Figure 3:
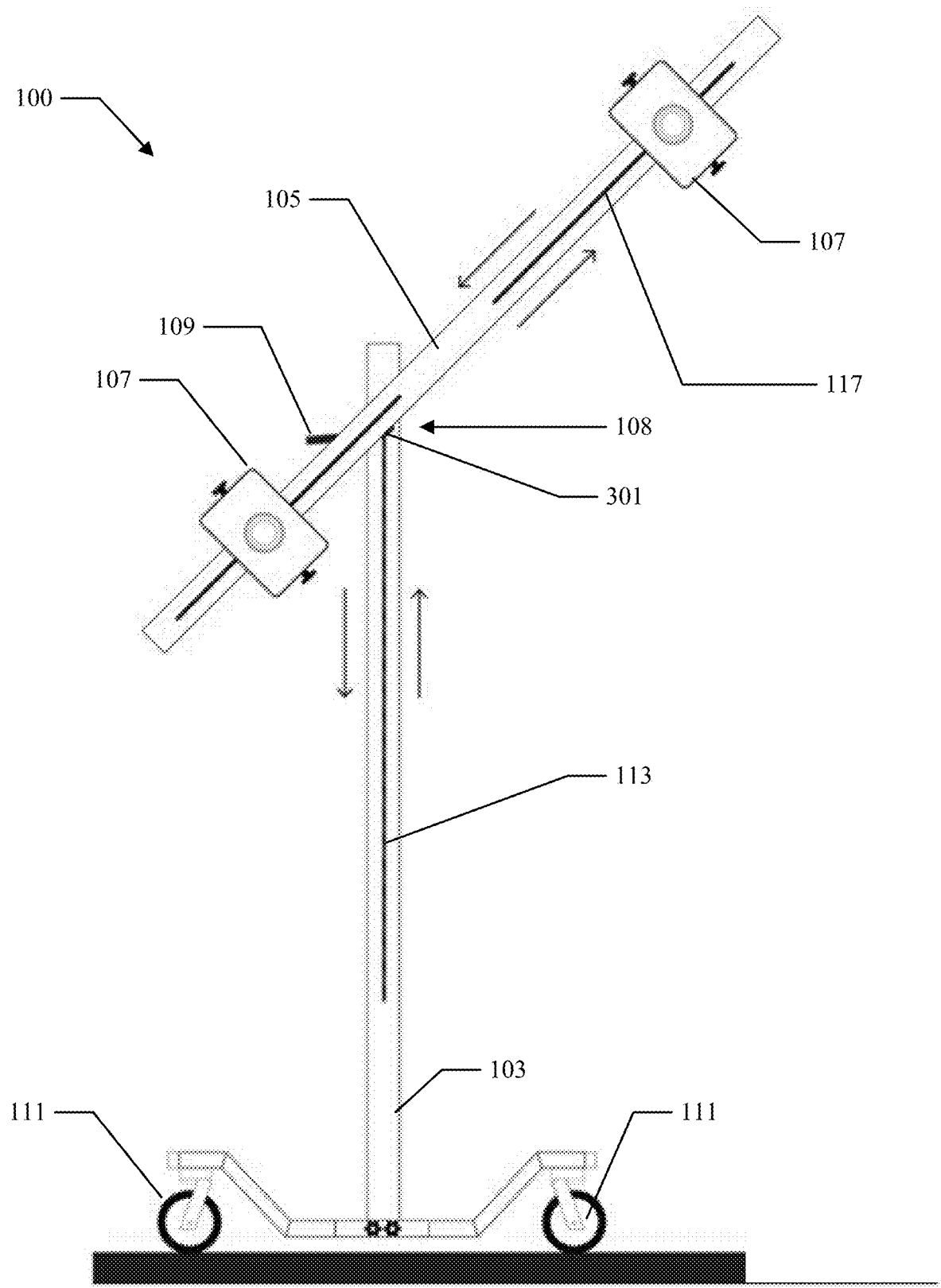
FIG. 3 depicts an embodiment of the appliance stand with the appliance arm positioned in a cantilevered configuration.

FIG. 3 shows an embodiment of appliance stand 100 with the appliance arm 105 in a cantilevered position and with the handle 109 positioned at the back of the appliance stand 100. Here, the multi-axial connector 108 has enabled the appliance arm 105 to be translated to the right of the arm support 103, as shown in the drawing, so that the appliance arm 105 extends farther to the right side of the arm support 103 than in the embodiment shown in FIG. 1. The appliance arm 105 is capable of translating in either direction along the longitudinal axis of the appliance arm 105. In extreme configurations, such as those shown in FIGS. 5C through 5F, the appliance arm 105 is positioned with the multi-axial connector 108 proximate to an end of the appliance arm 105, such that distal end of the appliance arm 105 is remote from the arm support 103 and multi-axial connector 108.

Figures 4A, 4B:
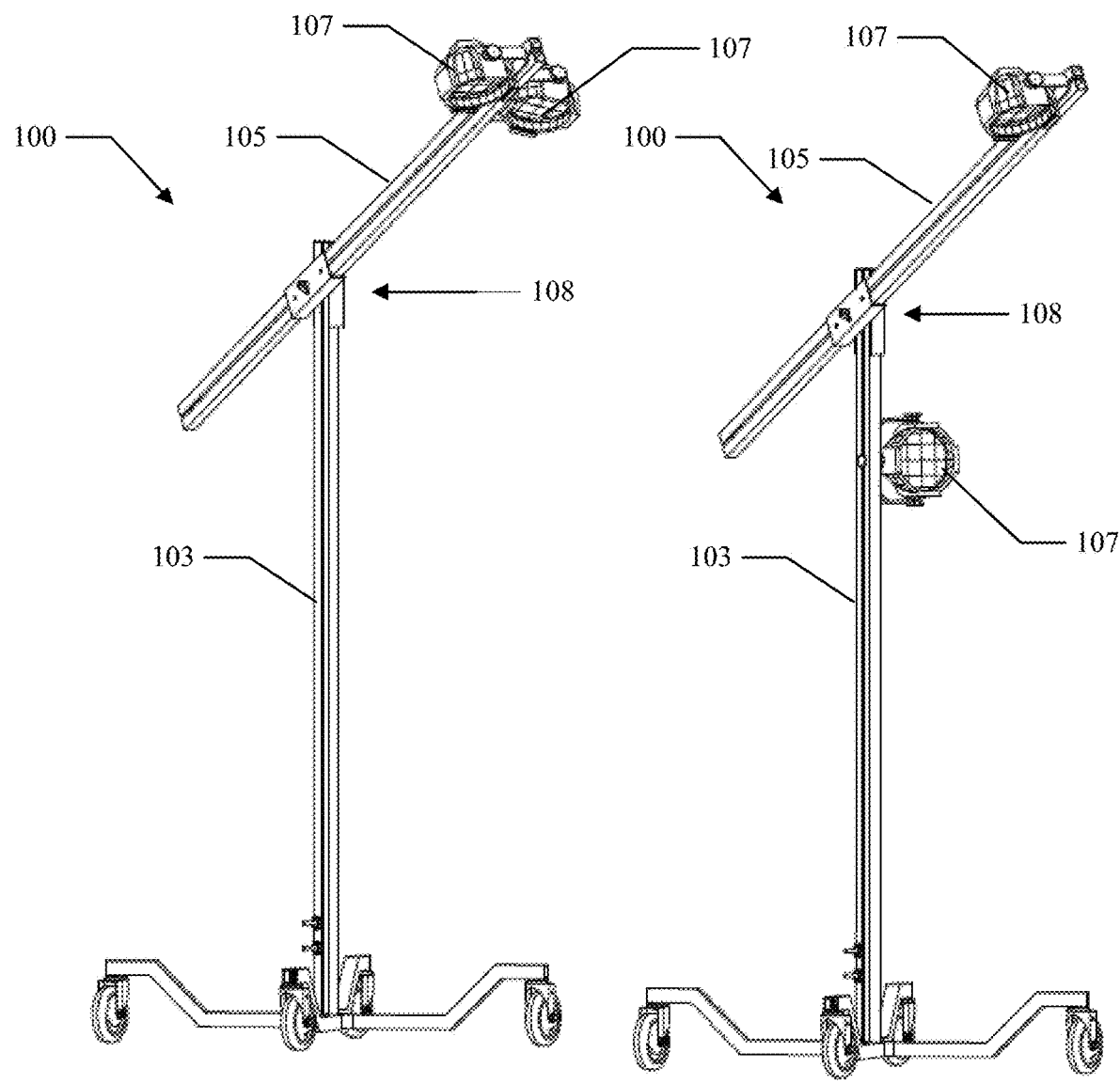
FIGS. 4A-4B depict an embodiment of the appliance stand in a cantilevered configuration with varying appliances positioned on the appliance arm and the arm support.

FIGS. 4A-4B depict an embodiment of the appliance stand 100 in a cantilevered configuration with multiple appliances 107 positioned on the appliance arm 105 as well as on the arm support 103. FIG. 4A depicts two lamp appliances 107 attached at an end of the appliance arm 105. FIG. 4B depicts one lamp appliance 107 attached at the end of the appliance arm 105 and another lamp appliance 107 attached directly to the arm support 103. Lamps or other appliances 107 can be positioned anywhere and in any multiple on the appliance arm 105 and arm support 103.

FIGS. 5A-5J illustrate additional views of the appliance stand 100, showing potential configurations that can be achieved by rotating, repositioning and cantilevering the appliance arm 105. FIG. 5A shows the appliance stand 100 with the appliance arm 105 rotated in a position generally parallel to the arm support 103. FIG. 5B depicts the appliance stand of FIG. 5A with the appliance arm translated vertically along the longitudinal axis of the arm support 103. FIG. 5C shows the appliance arm 105 extended to the farthest extent vertically, in this instance approximately doubling the height of the appliance stand 100. FIG. 5D shows the appliance stand 100 of FIG. 5C, where the appliance arm 105 has been rotated slightly around the multi-axial connector 108. FIGS. 5E and 5F continue that rotation of the appliance arm 105, such that the appliance arm 105 is cantilevered. FIGS. 5G and 5H show the appliance arm 105 translated longitudinally along the appliance arm axis until the multi-axial connector 108 is at the approximate center of the appliance arm 105 and the appliance arm 105 is rotated until the appliance arm 105 approaches parallel with the ground. FIGS. 5I and 5J depict movement of the appliance arm 105 substantially vertically, along the longitudinal axis of the arm support 103. As shown, the appliance arm 105 can be moved along or around multiple axes simultaneously, providing fluid movement and an incredible array of positions and configurations.

Figures 6A, 6B:
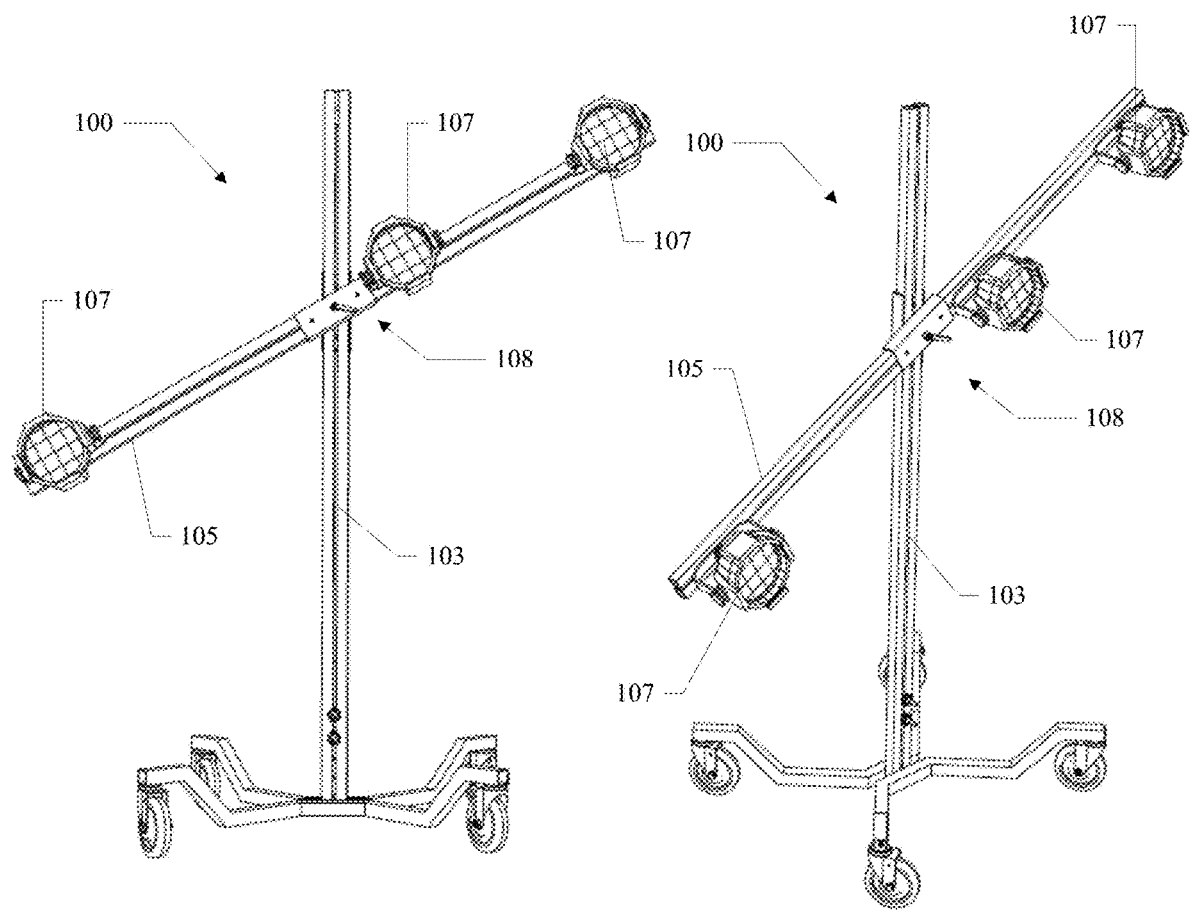
FIGS. 6A-6B depict an embodiment of the appliance stand where the appliance arm is capable of holding three lamps.

FIGS. 6A-6B depict an embodiment of the appliance stand 100 supporting three appliances 107, such as lights. In additional embodiments, the appliance stand 100 can support as many appliances 107 or lights as the length of the appliance arm 105 permits, or the appliance stand 100 can be used without appliances 107 or to support a single appliance 107. FIGS. 6A-6B depict one such additional embodiment, supporting more than two appliances or lights. Wiring of the appliances 107 can be external to the appliance stand 100, or threaded through the appliance arm 105 and other portions of the appliance stand 100. Appliances or lights can be attached to the appliance arm 105 in a variety of ways. For example, in embodiments, appliances like lamps can be attached via clamps that secure the light to the appliance arm 105 or arm support 103. In other embodiments, the appliance arm 105 can include a T-passage, where a portion of the appliance 107 or light can be slotted into the T-passage so that the appliance 107 can slide to the desired position on the appliance arm 105 or arm support 103. In other embodiments, the appliance arm 105 or arm support 103 can include a series of apertures to which the appliances 107 can be connected. In still other embodiments, appliances 107 can be tied or fastened to the appliance arm 105 or arm support 103 using additional hardware. In further embodiments, appliances 107 may also be welded to, or seated within, the appliance arm 105 or arm support 103. In another embodiment, appliances or lights can also be attached to the appliance arm 105 or arm support 103 via magnets, including but not limited to rare earth magnets.

Figures 7A, 7B:
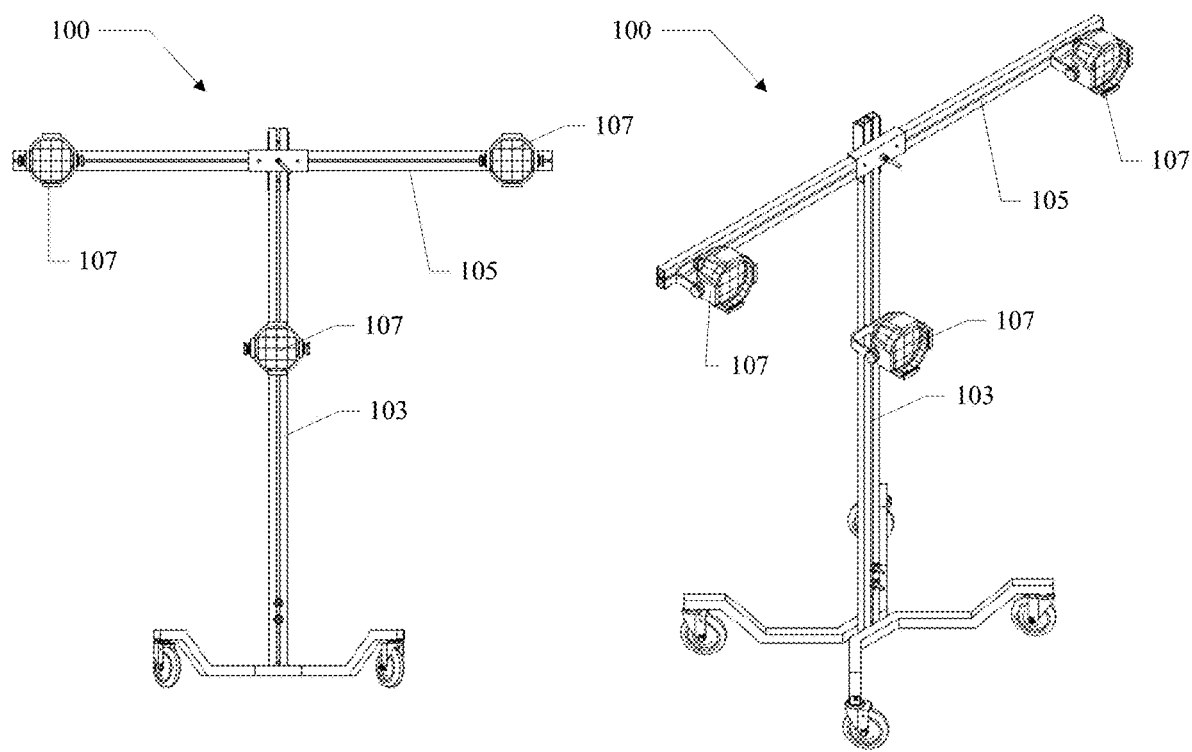
FIGS. 7A-7B depict a configuration of an embodiment of the appliance stand with appliances on both the appliance arm and the arm support.

FIGS. 7A-7B illustrate another configuration of the appliance stand where appliances 107 can be located on the appliance arm 105 and/or the arm support 103 in varying positions. FIG. 7A shows the appliance arm 105 in a perpendicular position relative to the arm support 103, with the appliance arm 105 supporting a lamp on the end of each side of the appliance arm 105. The arm support 103 also is supporting one lamp. FIG. 7B shows a similar configuration to FIG. 7A, with an additional appliance 107 located near the bottom of the arm support 103.

Figure 8:
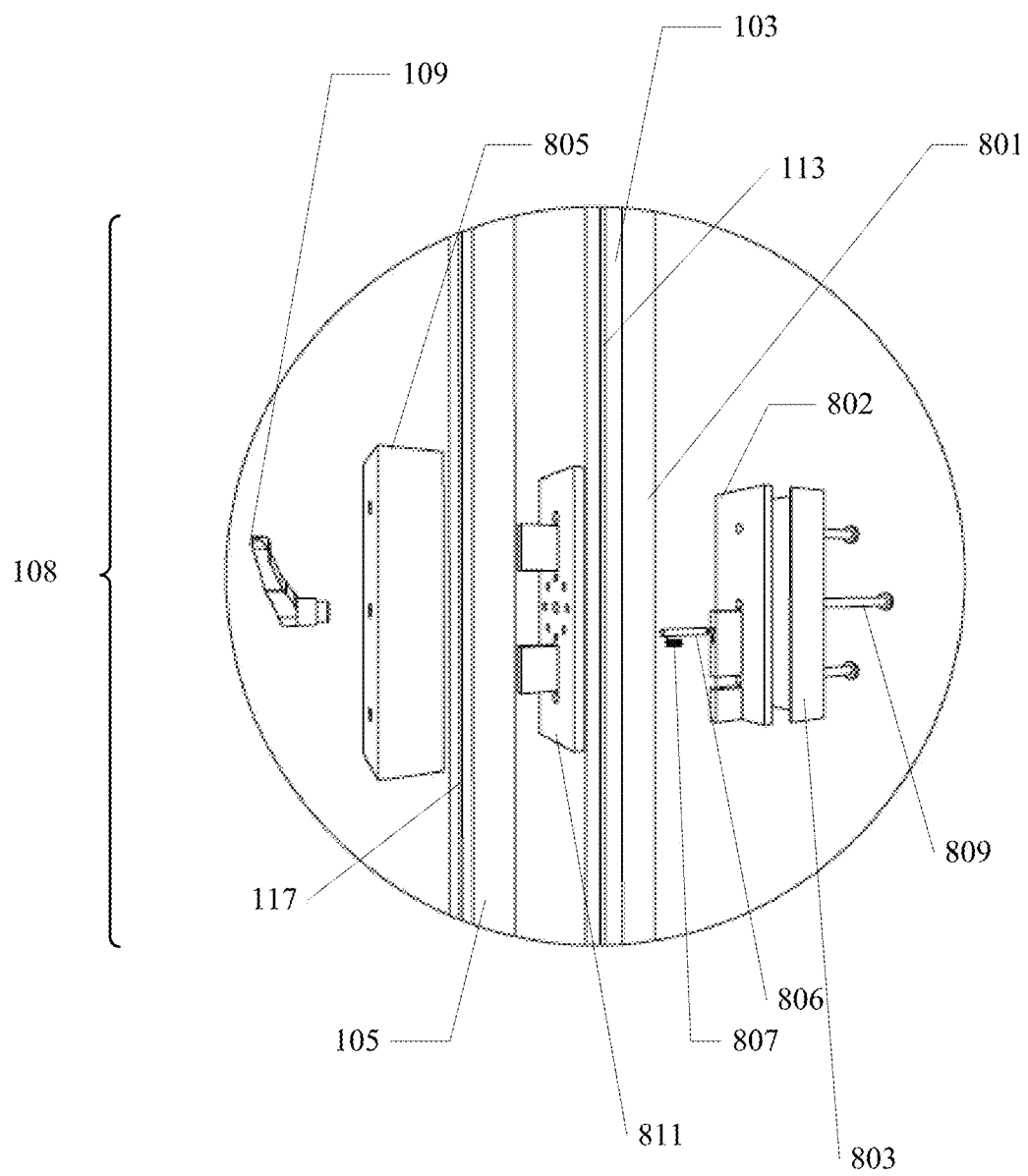
FIG. 8 depicts an exploded view of the components of an embodiment of the multi-axial connector.
Figure 9:
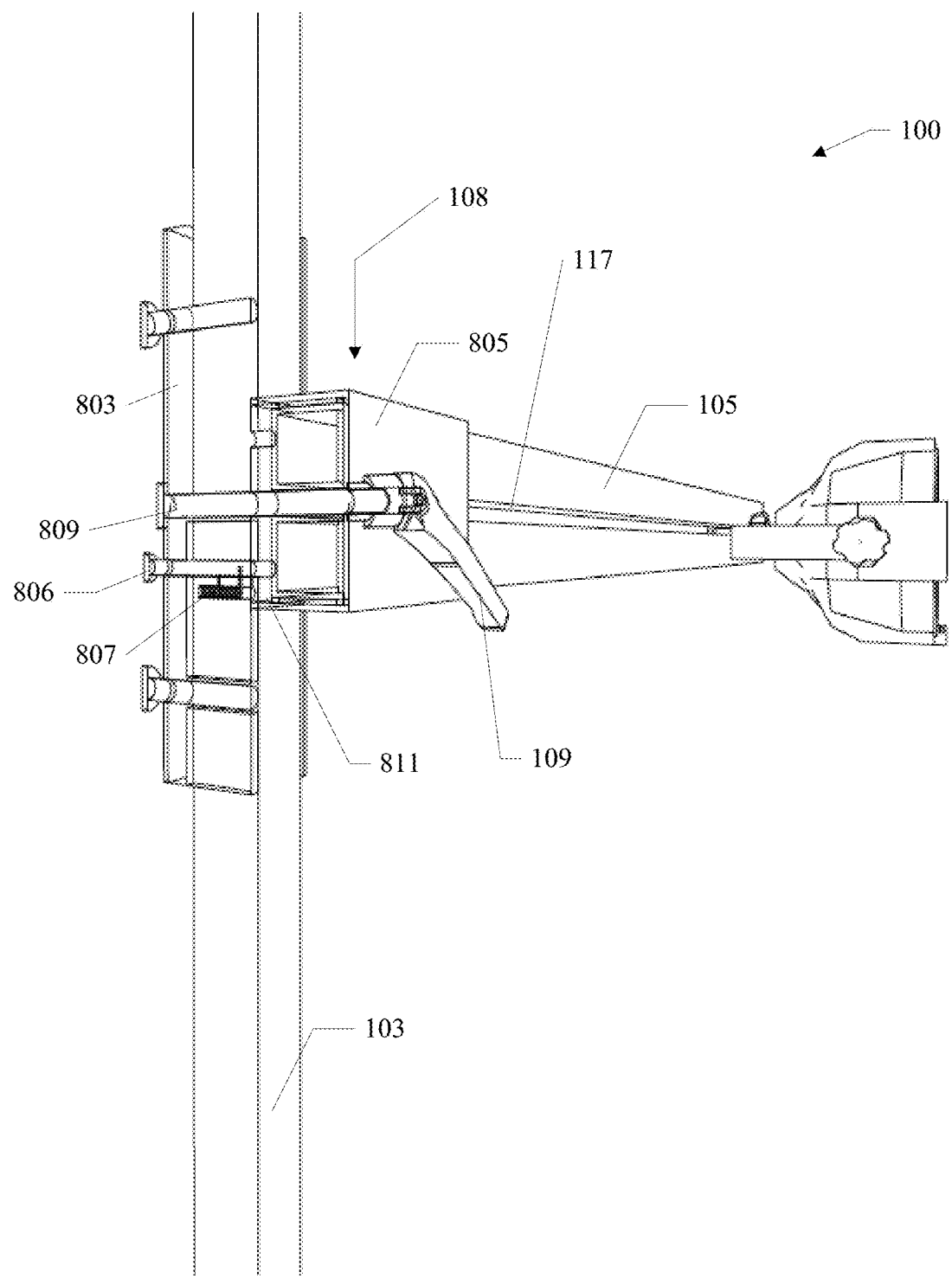
FIG. 9 depicts a cross-sectional view of an embodiment of the multi-axial connector in a secured position.

Turning now to FIGS. 8 and 9, embodiments of the multi-axial connector 108 and locking mechanism are shown and described in greater detail. In embodiments, the multi-axial connector 108 and locking mechanism include a pivot 809, such as screw, bolt, pin or other fastener that extends from the front of the appliance stand 100 through both the appliance arm 105 and the arm support 103. It is the motion of the pivot 809 seated within channels or slots in the arm support 103 and appliance arm 105 that enables the translation of the appliance arm 105. In embodiments, when the pivot 809 slides up or down within the channel in the arm support 103, it lowers or raises the appliance arm 105 with respect to the arm support 103. When the pivot 809 slides longitudinally within the channel of the appliance arm 105, the appliance arm 105 translates along its longitudinal axis relative to the arm support 103. And, when the appliance arm 105 pivots around the pivot 809, the appliance arm 105 rotates.

The pivot 809 is attached to the handle 109, which in embodiments, is positioned on the front or the back of the appliance stand 100, a mounting plate 805 proximate to the appliance arm 105 and a back plate 803 or bolt on the opposite side of the appliance stand 100. The appliance arm 105 can pivot or rotate around the pivot 809 to achieve the rotational movement relative to the arm support 103 as described above. When the desired angle of the appliance arm 105 is achieved, the pivot 809 is tightened via the handle 109 to clamp the arm support 103 and the appliance arm 105 between the mounting plate 805 and back plate 803. In embodiments, some or all of the pivot 809 is threaded such that rotating the handle 109 pulls the handle toward the appliance arm 105 and arm support 103. This motion tightens the pivot 809 and, in embodiments, by tightening the pivot 809, the back plate 803 and mounting plate 805 are frictionally engaged or drawn against the arm support 103 and appliance arm 105 respectively. If the handle 109 and pivot 809 are tightened sufficiently, the pressure from the back plate 803 and mounting plate 805 against the arm support 103 and the appliance arm 105 will cause the appliance arm 105 to be fixed in place relative to the arm support 103. In embodiments, the locking mechanism acts as a clamp to hold the appliance arm 105 in place and frictional forces will lock the appliance arm 105 in the selected position. This pressure exerted by tightening the pivot 809 can also fix the translational movement of the appliance arm 105 relative to the arm support 103.

As can be seen in FIG. 1, in embodiments, the arm support 103 includes a longitudinal channel or slot 113 that extends from the front through to the back of the arm support 103. In an embodiment, the arm support 103 consists of two substantially parallel, connected base posts 115, with the arm support slot 113 or gap between the base posts 115. In other embodiments, the arm support 103 can be any suitable shape, including but not limited to, cylindrical or rectangular that includes an arm support slot 113 that extends from the front to the back of the arm support 103 along the longitudinal axis of the arm support 103. The arm support slot 113 provides the longitudinal path along which the pivot 809 can slide to translate the appliance arm 105.

In an embodiment, the pivot 809 extends through the arm support slot 113 in the arm support 103 and the appliance arm 105 to connect to the handle 109 and mounting plate 805 to the back plate 803. In embodiments, as the pivot or connector 809 is tightened via the handle 109, the appliance arm 105 is drawn or moved toward the arm support 103. Frictional forces and pressure exerted by the pivot 809 hold the appliance arm 105 in place relative to the arm support 103. The clamp effectively formed by the pivot 809, mounting plate 805, and back plate 803 prevents the pivot 809 from sliding within the arm support slot 113, locking the appliance arm 105 in place.

In an embodiment depicted in FIG. 9, the appliance arm 105 includes a channel or slot, referred to herein as the appliance arm slot 117, which runs longitudinally on the appliance arm 105. The pivot 809 is seated within this appliance arm slot 117 in the same manner in which it is seated in the arm support slot 113. By moving the appliance arm 105 with respect to the pivot 809, the appliance arm 105 is translated along its longitudinal axis. In the illustrated embodiment, the appliance stand 100 includes a mounting plate 805 positioned on or in the appliance arm 105. When the pivot 809 is tightened, the mounting plate 805 is forced against the arm support 103 or appliance arm 105 and it is that pressure that locks the multi-axial connector 108 in place.

In other embodiments, the appliance arm 105 is not straight and the appliance arm slot 117 is not linear. For example, the appliance arm 105 can be curved, T-shaped, S-shaped, branch, or take any other form suitable for supporting one or more appliances 107. The appliance arm slot 117 can generally extend from one end to the other of the appliance arm, but need not be straight nor extend all the way to either end of the appliance arm 105. In such embodiments, the pivot of the multi-axial connector 108 moves along the path of the appliance arm slot 117 enabling the appliance arm 105 to translate relative to the arm support 103.

In embodiments, the appliance arm 105 contains a hollow and the mounting plate 805 can be seated within its appliance arm slot 117. In other embodiments, the appliance arm slot 117 is created by connecting two separate tubes or bars. The appliance arm 105 is formed by securing those two substantially parallel bars together. The securing mechanism could be a bolt, screw, or another fastener.

In the multi-axial connector 108 as described above, the pivot 809 is capable of acting as a pivot point for the appliance arm 105, allowing the angle of the appliance arm 105 relative to the arm support 103 to be adjusted. Accordingly, in embodiments, the appliance arm 105 can pinwheel up to 360 degrees. In embodiments, from the multi-axial connector 108 the appliance arm 105 can be positioned horizontally (in parallel with the ground), vertically or at a series of angles between horizontal and vertical. Tightening the pivot 809 will fix the appliance arm 105 in position relative to the arm support 103. In embodiments, tightening the pivot 809 fixes the height of the appliance arm 105, the angle at which the appliance arm 105 extends from the arm support 103, and the position of the appliance arm 105 relative to the multi-axial connector 108, which controls the point along the appliance arm 105 where it attaches to the arm support 103.

Turning again to FIG. 8, an exploded view of an embodiment of the multi-axial connector 108 of the appliance stand 100 shows the arm support 103 having a lockpin plate 802, described in use with the lockpin 806 below. The pivot 809 extends from the rear of the appliance stand 100 through the lockpin plate 802, the locking plate 811, as well as the arm support 103 and the appliance arm slot 117 of the appliance arm 105. In embodiments, the mounting plate 805 and locking plate 811 can be connected to each other such that they form a sleeve around the exterior of the appliance arm 105. Similarly, the back plate 803 and lockpin plate 802 can be connected to each other to form a sleeve around the exterior of the arm support 103. These configurations spread the stress of the multi-axial connector 108 over a larger surface area and reduce the potential for the appliance arm 105 or arm support 103 to warp or stress.

In other embodiments, where the arm support 103 is made of a light-weight material, the mounting plate 805 or back plate 803, or both can be formed as a core that slides within a hollow channel of the appliance arm 105 or arm support 103, respectively. Again, a larger core piece distributes the force of the multi-axial connector 108 over a larger area, thereby extending the life of the pivot 809 and the multi-axial connector.

In some further embodiments, the multi-axial connector 108 is made up of a back plate 803 positioned on the back of the arm support 103. In some embodiments, the back plate 803 wraps around the sides of the arm support 103 to ensure the bars do not bend from the weight of any attached appliances. A second plate, called the mounting plate 805, is positioned between the handle 109 and the front of the appliance arm 105. As the handle 109 is rotated, the pivot 809 is tightened so that the back plate 803 and the mounting plate 805 engage the arm support 103 and effectively hold the appliance arm 105 in place relative to the arm support 103 via friction.

In embodiments, the locking mechanism also includes a lockpin 806. If a user does not tighten the handle 109 sufficiently to securely clamp the appliance arm 105 in position, a cantilevered appliance arm 105 could rotate, dropping the end of the appliance arm 105 distal from the arm support 103 onto a user, the floor, or a project. The lockpin 806 can prevent such user error. In embodiments, the locking plate 811 includes a series of apertures sized to hold the lockpin 806. The apertures can be spaced in a circle in the locking plate 811, so that as the locking plate 811 and appliance arm 105 are rotated, the lockpin 806 can be seated in one of the apertures to fix the locking plate 811 (and therefore the appliance arm 105) at an angle relative to the arm support 103. The lockpin 806 inserts from the back of the arm support 103: first, through the back plate 803, then through the slot 113 in the arm support 103, and then through one of the apertures in the locking plate 811. In one embodiment, the lockpin 806 will lock into apertures drilled at 45-degree angles. However, these apertures can be drilled at any desired angles. In another embodiment, the lockpin is spring-loaded or biased to automatically insert into an aperture in the locking plate 811 to lock the angle of the appliance arm 105 relative to the arm support 103, unless the spring-loaded lockpin 806 is disengaged by the user. As illustrated a spring 807 biases the lockpin 806 such that the spring-loaded lockpin 806 acts as an additional safety mechanism to secure and support the appliance arm 105. The spring-loaded lockpin 806 locks the rotating appliance arm 105 at different angles defined by the apertures in the lock plate. The spring-loaded lockpin 806 locks into one of the apertures, without the user being required to manually place the lockpin 806 into a locked position. In embodiments, the lockpin plate 802 reinforces the multi-axial connector 108 to prevent the force exerted on the lockpin 806 from warping or stressing the arm support 103.

Turning again to FIG. 9, a cross-section of the arm support 103 and multi-axial connector 108 is shown. The handle 109 is attached to the pivot 809. The mounting plate 805 and the appliance arm 105 can rotate like a pinwheel around the pivot 809. Rotating the handle 109 drives the pivot 809 through the back plate 803, and through the passage 113 of the arm support 103 and the mounting plate 805. The pressure from the back plate 803 and mounting plate 805 against the arm support 103 holds the multi-axial connector 108 in a fixed position. In embodiments, the plates 803, 805 have a larger surface area than the pivot 809 alone, they provide greater frictional force to the multi-axial connector 108, thereby increasing the multi-axial connector 108's resistance to movement.

Referring now to FIGS. 10A, 10B, and 10C, close up views of the front and back of the multi-axial connector 108 in a secured position are depicted. FIG. 10A shows the appliance stand 100 with the arm support 103, appliance arm 105, and multi-axial connector 108. FIG. 10B provides a closer look at the front of the multi-axial connector 108 including the mounting plate 805 and handle 109. FIG. 10C provides a closer view of the back of the multi-axial connector 108, with the back plate 803 and an end of the pivot 809 visible. In all of the views, the appliance arm 105 is depicted at an angled position relative to the arm support 103. The appliance arm 105 can locked in place by the locking mechanism.

Figures 11A, 11B:
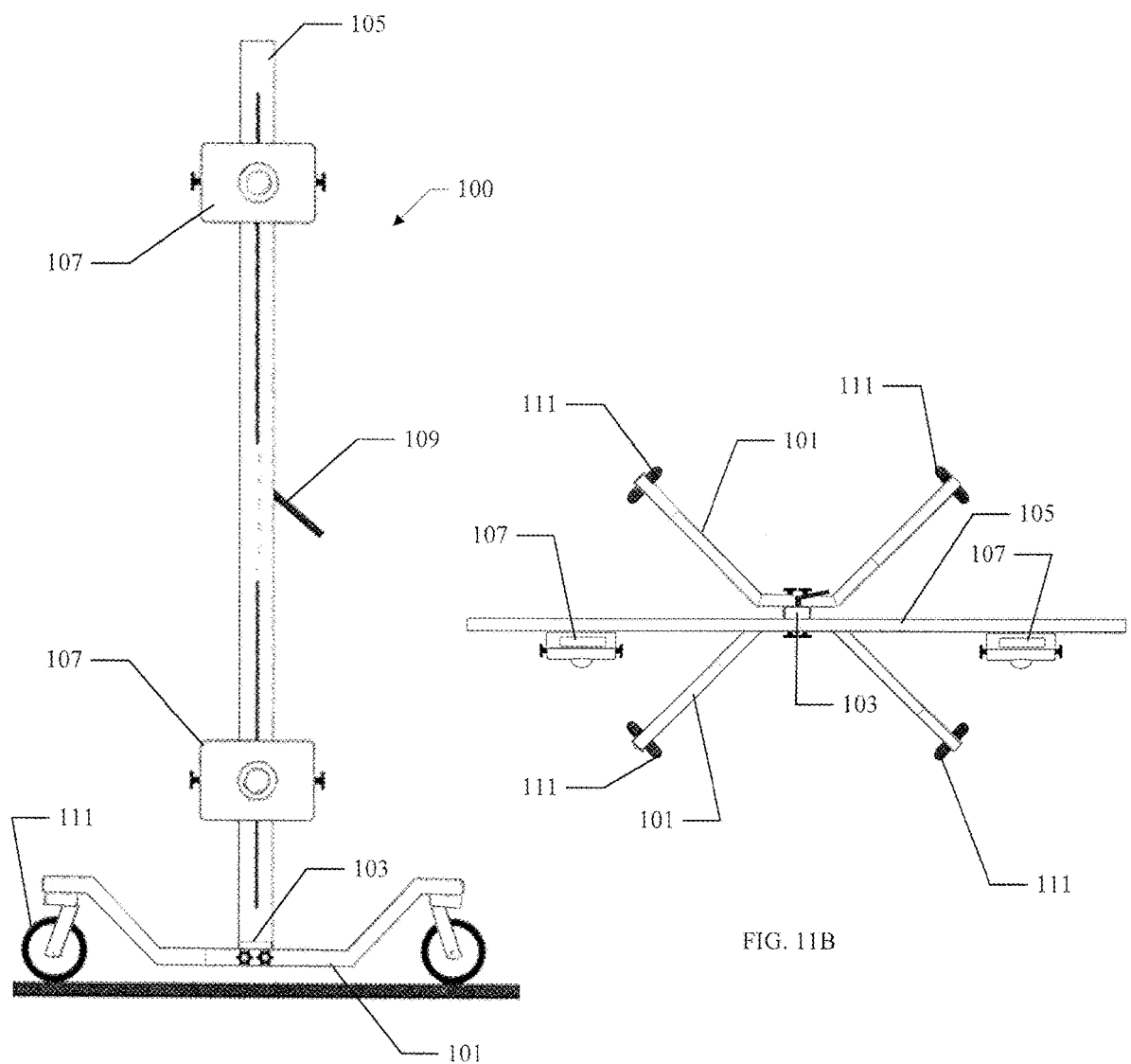
FIGS. 11A-11B depict an embodiment of the base having a dropped center of gravity and mounted on casters.

Referring now to FIGS. 11A and 11B, a front view and top view, respectively, of the appliance stand 100 is shown. The illustrated embodiment of the base 101 provides support for the appliance stand 100. Here, the base 101 of the appliance stand 100 is on casters 111 or wheels so it can be easily moved within a manufacturing facility. In FIG. 11A, the base 101 has a dropped center of gravity as a function of the curve of the legs of the base 101, which helps to maintain the appliance stand 100 stability when shifted to a cantilevered configuration or moved. In additional embodiments, the base 101 can be without wheels or mounted to the floor, a wall or another structure. The dimensions of the base can vary. A larger base can provide more stability, but may be impractical based upon the size of the workspace.

To operate one embodiment of the appliance stand 100, a user would roll the appliance stand 100 to its desired location in a workplace by applying force to the appliance stand 100 along the arm support 103 or appliance arm 105 via pushing or pulling. The exerted force would cause the casters 111 or wheels to roll, and the appliance stand 100 could be moved to the desired location. A user would then remove the lockpin 806 by pulling it from the rear of the device, out of the back plate 803 where it was seated. The user would turn the handle 109 to loosen the pivot 809, thereby relaxing the frictional force applied by the mounting plate 805 and the back plate 803. The user could then adjust the appliance arm 105 to relocate it to the desired height relative to the arm support 103. Once at the desired height, the user may apply a force along the appliance arm 105 to slide it along its longitudinal axis. A user may also apply a force to pinwheel or rotate the appliance arm 105 until in its desired orientation. Once the appliance arm 105 has been positioned in the desired configuration, a user would rotate the handle 109 clockwise tighten the pivot 809, thereby reengaging the mounting plate 805 and back plate 803. The lockpin 806 could be reinserted through the rear of the back plate 803 and slid into an aperture on the mounting plate 805. The aperture into which the lockpin 806 would fit would depend on the angle to which the appliance arm 105 had been rotated, locking the appliance stand 100 into the desired configuration.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. An appliance stand comprising:
   an arm support having an arm support slot that extends longitudinally on the arm support;
   an appliance arm configured to support at least one appliance, the appliance arm having an appliance arm slot extending longitudinally on the appliance arm;
   a multi-axial connector that connects the appliance arm to the arm support, the multi-axial connector having a pivot seated within the arm support slot and extending through the appliance arm slot;
   a locking mechanism that selectively secures the multi-axial connector and the appliance arm, wherein the locking mechanism is configured to frictionally engage the appliance arm and the arm support to hold the appliance arm in a desired position; and
   a locking plate with a plurality of apertures sized to hold a lockpin and a pivot aperture, wherein the pivot is seated within the pivot aperture and the lockpin is configured to insert into a selected aperture of the plurality of apertures to fix the appliance arm at a selected angle relative to the arm support.

2. The appliance stand of claim 1, wherein the pivot is configured to slide within the appliance arm slot in such a way that the appliance arm translates along a path defined by the appliance arm slot.

3. The appliance stand of claim 1, wherein the pivot is configured to slide within the arm support slot in such a way that the appliance arm translates along the longitudinal axis of the arm support.

4. The appliance stand of claim 1, wherein the appliance arm is configured to rotate around the pivot in a pinwheel motion.

5. The appliance stand of claim 1, further comprising a mounting plate and a back plate connected to the pivot and positioned on opposite sides of the appliance arm and the arm support, wherein the locking mechanism is configured in a such a manner that the mounting plate and the back plate act as a clamp to frictionally engage the appliance arm and the arm support.

6. The appliance stand of claim 1, wherein the lockpin is spring-loaded.

7. The appliance stand of claim 1, wherein the pivot extends through the locking plate and the appliance arm slides longitudinally with respect to the locking plate.

8. The appliance stand of claim 1, further comprising a first appliance removably attached to the appliance stand, wherein the both appliance arm and the arm support are configured to support the first appliance.

9. The appliance stand of claim 8, further comprising a second appliance removably attached to the appliance stand.

10. An appliance stand, comprising:
    an appliance arm capable of supporting one or more appliances;
    an arm support that supports the appliance arm;
    an appliance removably connected to one of the appliance arm or the arm support; and
    a multi-axial connector that connects the appliance arm and the arm support, the multi-axial connector configured to facilitate translational movement of the appliance arm along a first axis and a second axis, and rotational movement of the appliance arm around a third axis;
    a frictional locking mechanism that secures the multi-axial connector in such a way that the appliance arm is fixed in position relative to the arm support; and
    a locking plate slidably attached to the appliance arm with a plurality of apertures sized to hold a lockpin, wherein the lockpin is configured to insert into a selected aperture of the plurality of apertures to fix the appliance arm at a selected angle relative to the arm support.

11. The appliance stand of claim 10, wherein the arm support includes a first longitudinal channel along the first axis and the multi-axial connector slides along the longitudinal channel in such a way that the appliance arm translates along the first axis.

12. The appliance stand of claim 11, wherein the appliance arm includes a second longitudinal channel along the second axis and the multi-axial connector slides along the second longitudinal channel in such a way that the appliance arm translates along the second axis.

13. The appliance stand of claim 12, wherein the third axis is substantially perpendicular to the first longitudinal channel of the arm support and the second longitudinal channel of the appliance arm, and the multi-axial connector is configured to rotate in such a way that the appliance arm rotates around the third axis.

14. The appliance stand of claim 10, further comprising a locking mechanism that fixes the position and angle of the appliance arm relative to the arm support.

15. The appliance stand of claim 10, wherein the arm support includes a first longitudinal channel along the first axis, and the appliance arm includes a second longitudinal channel along the second axis, wherein the multi-axial connector includes a pivot seated in the first longitudinal channel and the second longitudinal channel in such a manner that the pivot slides within the first and second longitudinal channels to translate the appliance arm along the first and second axes, respectively.

16. The appliance stand of claim 15, further comprising a mounting plate attached to the pivot and proximate the appliance arm, and a back plate attached to the pivot opposite the mounting plate and proximate to the arm support, the mounting plate and the back plate configured so as to clamp the appliance arm and the arm support when the pivot is tightened.

17. The appliance stand of claim 16, further comprising a handle attached to a threaded portion of the pivot, wherein the pivot is configured to tighten by turning the handle, drawing the mounting plate toward the back plate and clamping the appliance arm and the arm support.

18. The appliance stand of claim 16, wherein the locking plate and the mounting plate are connected to form a sleeve on the appliance arm.

19. An appliance stand apparatus, comprising:
an arm support having an arm support slot that extends longitudinally on the arm support;
an appliance arm configured to support at least one appliance, the appliance arm having an appliance arm slot extending longitudinally on the appliance arm;
a multi-axial connector that connects the appliance arm to the arm support, the multi-axial connector having a pivot seated within the arm support slot and extending through the appliance arm slot; the pivot configured to slide within the arm support slot and within the appliance arm slot to translate the appliance arm relative to the arm support and wherein the appliance arm is configured to rotate around the pivot;
a locking mechanism configured to selectively secure the appliance arm, wherein the locking mechanism includes a mounting plate and a back plate connected to the pivot and positioned on opposite sides of the multi-axial connector, wherein the mounting plate and the back plate are drawn towards each other to clamp the appliance arm and the arm support; and
a locking plate attached to the appliance arm, the locking plate having a plurality of apertures sized to receive a lockpin, wherein the lockpin is configured to insert into a selected aperture of the plurality of apertures and through the arm support in such a manner as to fix the appliance arm at a selected angle relative to the arm support.

* * * * *